United States Patent Office 3,127,349
Patented Mar. 31, 1964

3,127,349
LUBRICATING OIL COMPOSITIONS HAVING A HIGH VISCOSITY INDEX
Jack Rockett, Westfield, N.J., assignor to Esso Research and Engineering Company, a corporation of Delaware
No Drawing. Filed Sept. 29, 1961, Ser. No. 141,578
5 Claims. (Cl. 252—32.7)

This invention relates to oil compositions having high viscosity indices and their preparation. More specifically, this invention concerns the compositions resulting from and the process concerning the addition of certain oil-soluble polar compounds to lubricating oil compositions containing conventional Dean and Davis viscosity index (V.I.) improving additives and detergency improving additives. The polar compounds cause an increase in the V.I. above the level obtainable with a V.I. improver. Moreover, the presence of these polar compounds tends to prevent decrease of V.I. with time.

It is known that in many instances the preparation of high quality, automotive, crankcase lubricants requires that various compounds be added to a mineral oil base stock in order to fortify and improve the oils' natural characteristics. V.I. improvers and lubricating oil detergents are exemplary of typical oil additives. A V.I. improver serves the function of reducing the change in oil viscosity which normally accompanies changes in oil temperature. Lubricating oil detergents generally improve and maintain the oil cleanliness by keeping sludges suspended so they can be drained when the oil is changed. However, it has been observed that a lubricating oil containing both additives, when permitted to stand, will exhibit a continually declining viscosity index over a period of time until some minimum level is reached.

It has now been found, and forms the substance of this invention, that by adding small quantities of certain oil soluble polar compounds to an oil at about the same time the V.I. and detergent additives are added, a substantial V.I. increase over that which can be obtained with a V.I. improver is obtained and V.I. diminishment with time is greatly reduced. Therefore, the advantages of this invention are twofold. First a viscosity index is obtainable beyond the level observed to be possible with a known V.I. improver. Secondly, there is less of a tendency for oil compositions with both V.I. improvers and detergency additives present to exhibit a diminished V.I. with the passage of time.

V.I. improvers suitable for use in the present invention include those which may be classified as also having detergent properties as well as those which have no detergent properties. V.I. improvers having detergent properties are usually polymeric materials generally consisting of a carbon-to-carbon backbone having various side chains. It is the selection of the side chains which governs the viscosity index and detergency improving properties of the polymer. One such type of polymer comprises those which are prepared by copolymerizing a polar monomer with various unsaturated esters. The esters can be esters of unsaturated mono or dicarboxylic acids, or esters of unsaturated alcohols, as well as various combinations thereof.

The preferred ester monomers are prepared from $C_2$ to $C_6$ carboxylic acids and $C_2$ to $C_{20}$ alcohols with at least one of said acid or said alcohol containing an ethylenic unsaturation. Usually about 1 to 20 mol. percent of the polymer will be the polar monomer, while the remainder is the ester monomer. The copolymerization is generally carried out by using peroxide type catalysts such as benzoyl peroxide under conventional conditions.

To illustrate, among these polymeric materials are copolymers of vinyl acetate, alkyl fumarates and maleic anhydride; copolymers of acrylates or methacrylates with maleic anhydride or 2-N-vinyl pyrrolidone; copolymers of vinyl acetate, alkyl fumarates and 2-N-vinyl pyrolidone. A more specific example is a copolymer having intrinsic viscosities in toluene of about 0.7 to 0.9 which is formed by polymerizing 30 to 70 wt. percent of vinyl acetate with 60 to 20 wt. percent of an alkyl fumarate mixture and 0.1 to 10.0 wt. percent of maleic anhydride (or 2-N-vinyl pyrrolidone), using a benzoyl peroxide catalyst and wherein the alkyl fumarates consist of a mixture of about 10 to 40 weight percent of a di-$C_8$ Oxo fumarate and 60 to 90 weight percent of a di-tallow fumarate.

In addition to the above detergent V.I. improvers, nondetergent V.I. improvers can also be used. These latter materials are similar to the detergent type, but contain no polar group in the molecule. Examples of nondetergent V.I improvers include copolymers of the various unsaturated esters mentoned above, e.g., vinyl acetate and dialkyl fumarate in a relative mole ratio of said acetate to said fumarate of 1:1, where said alkyl groups are derived from normal or branched alkyl groups. Other examples of nondetergent V.I. improvers which contain from 2 to 24 carbon atoms are polyisobutylene of 5000 to 30,000 molecular weight, methacrylate polymers and copolymers, maleate ester copolymers, polyvinyl ether polymers, and the like.

The detergent additives which are commonly used, include petroleum sulfonates, synthetic alkyl aryl sulfonates, various alkyl phenates, alkyl phenate sulfides, phosphosulfurized olefin polymers, and various combinations of these additives. Following are specific descriptions of several of the above types of detergent additives.

Petroleum sulfonates generally used as lubricating oil detergents are the oil-soluble alkaline earth metal salts of high molecular weight sulfonic acids. These sulfonic acids are produced by the treatment of petroleum oils of the lubricating oil range with fuming sulfuric acid and generally have molecular weights of about 300 to 700, e.g., 350 to 500. Petroleum sulfonates are well known in the art and have been described in numerous patents, e.g. U.S. 2,467,176.

Detergent sulfonates can also be derived synthetically from relatively pure alkyl aryl sulfonic acids having from about 10 to 33 carbon atoms per molecule. For example, sulfonated products of alkylated aromatics such as benzene, toluene, xylene, and naphthalene alkylated with olefins or olefin polymers of the type of polypropylene, polyisobutylene, etc. can be used.

Specific examples of the above two types of sulfonates include calcium petroleum sulfonate, barium petroleum sulfonate, calcium di-$C_8$ alkyl benzene sulfonate, barium di-$C_9$ alkyl benzene sulfonate and calcium $C_{16}$ alkyl benzene sulfonate; wherein said di-$C_8$ alkyl groups are derived from diisobutylene; said $C_9$ alkyl groups are obtained from tripropylene and said $C_{16}$ alkyl group is obtained from tetraisobutylene.

The above sulfonates may be either neutral sulfonates, i.e., where the sulfonic acid is neutralized with an equal mole equivalent amount of metal base, or the sulfonates may be of the so-called "high alkalinity" type. In the latter case, additional metal base, in excess of that required for simple neutralization, is reacted with the sulfonate sulfonic acid to form an alkaline product which can then be blown with carbon dioxide to reduce its alkalinity and form a substantially neutral final product. Recent work has indicated that such so-called high alkalinity sulfonates are nothing more than dispersions of neutral sulfonates and a carbonate of the metal used which are believed to exist in the form of colloidal sols. In any event, the term sulfonate as used herein and in the appended claims includes both neutral sulfonates and so-called high alkalinity (or high metal content) sulfonates.

Phenate sulfides are also well known in the art and have been described in numerous patents, for example, U.S. 2,451,345 and U.S. 2,362,289. The more important of these materials are metal salts of phenol sulfides which may be typified by the following formula:

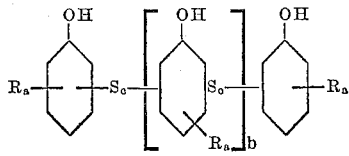

wherein R represents an alkyl group, $a$ is 0 to 4, $b$ is 0 to 10 and $c$ is 1 to 5. The metals used to form the phenate may be aluminum, cobalt, chromium, sodium, lead, tin, etc., or the alkaline earth metals as calcium, barium, strontium and magnesium. Each alkyl group can contain 5 to 20, e.g., 7 to 12, carbon atoms, either straight or branched chain. Specific examples of the phenate sulfides include barium tertiary octyl phenol sulfide, calcium tertiary octyl phenol sulfide, barium-calcium tertiary octyl phenol sulfide, barium tertiary amyl phenol sulfide, calcium tertiary amyl phenol sulfide, barium nonyl phenol sulfide, etc. High alkalinity (i.e. high metal content) phenate sulfides are also included in the above description. These materials are prepared by reacting the phenol sulfide with an excess of metal base and then neutralizing the basic product, generally by $CO_2$ blowing.

The phosphosulfurized olefin materials are also well known in the art. These materials are prepared by reacting an olefin or an olefin polymer with $P_2S_5$. A specific material of this type used in an example of the invention was $P_2S_5$ treated polybutene of about 1100 molecular weight.

The oil-soluble polar compounds which are capable of suppressing V.I. decrease include: lactones, nitrile esters, lactams, esters, nitriles, polyethers, and alcohol ethers.

Preferred lactones for use in the invention have the general formula:

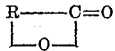

wherein R represents a divalent aliphatic hydrocarbon group, preferably saturated, branched or straight chain, containing 2 to 6 carbon atoms, preferably 2 to 5 carbon atoms. Specific examples include: γ-butyrolactone, β-propiolactone, and δ-valerolactone.

Preferred nitrile esters for use in the invention have the general formula:

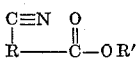

wherein R represents a divalent aliphatic hydrocarbon radical, preferably saturated, branched or straight chain, of 0 to 4 carbon atoms, preferably 1 to 3 carbon atoms; and R' represents an alkyl radical of 1 to 3 carbon atoms, preferably 1 to 2 carbon atoms. Specific examples are: ethyl cyanoacetate, methyl cyanopropionate, ethyl cyano formate, and ethyl cyanobutyrate.

Preferred lactams for use in the invention have the general formula:

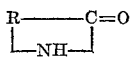

wherein R represents a divalent aliphatic hydrocarbon group, preferably saturated, branched or straight chain, containing 3 to 7 carbon atoms, preferably 3 to 6 carbon atoms. Specific examples include γ-butyrolactam, caprolactam, and δ-valerolactam.

Preferred esters for use in the invention have the general formula:

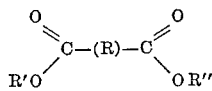

wherein R' and R" represent alkyl radicals containing 1 to 3 carbon atoms, preferably 1 to 2 carbon atoms; and R represents a divalent aliphatic hydrocarbon group, saturated or unsaturated, containing 0 to 3 carbon atoms, preferably 1 to 2 carbon atoms. Specific examples include diethyl maleate, diethyl malonate, dimethyl fumarate, dimethyl oxalate.

Preferred nitriles for use in the invention have the general formula:

wherein R represents a divalent aliphatic hydrocarbon group, preferably saturated, branched or straight chain, containing 1 to 3 carbon atoms, preferably 1 to 2 carbon atoms. Specific examples include malononitrile and succinonitrile.

Preferred alcohol ethers for use in the invention have the general formula:

$$R'-(OR)_n-OH$$

wherein R' represents an alkyl group of 1 to 4 carbon atoms, preferably 1 to 2 carbon atoms; R represents a divalent aliphatic hydrocarbon group, preferably saturated, branched or straight chain, containing 1 to 3 carbon atoms, preferably 1 to 2 carbon atoms; and $n$ represents a number between 1 and 5. Specific examples include: 3,6,9-trioxa undecanol (commonly sold as ethoxy triglycol) methoxy triglycol, Cellosolve, Carbitol, and butyl Cellosolve.

Preferred polyethers for use in the invention have the formula:

$$R'(OR)_nOR''$$

wherein R' and R" represent alkyl groups containing 1 to 3 carbon atoms, preferably 1 to 2 carbon atoms; R represents a divalent aliphatic hydrocarbon group, preferably saturated, branched or straight chain, containing 1 to 3 carbon atoms, preferably 1 to 2 carbon atoms, and $n$ is an integer from 1 to 5. Specific examples include bis-(2-methoxyethyl) ether, 1,2-bis-(2-methoxyethoxy)ethane, and 1,2-bis-(dimethoxy)ethane.

Viscosity index decrease can be minimized by adding the oil-soluble polar compound to a base oil composition containing a viscosity improver, and a detergent at any time before the V.I. of the oil has stopped decreasing. Preferably, however, the polar compound is blended in the oil at the same time as the other oil additives. Based upon the total weight of the final oil blend, the finished oil composition will consist of a major portion of mineral lubricating oil and on an active ingredient basis 1 to 8 wt. percent of V.I. improver, 0.5 to 6 wt. percent detergent, and 0.1 to 5 wt. percent oil-soluble polar compound. As a more preferred embodiment of the instant invention, the finished oil composition will be composed of a major proportion of a mineral lubricating oil, 1.5 to 4 wt. percent V.I. improver, 1 to 4 wt. percent detergent, and 0.2 to 2 wt. percent of an oil-soluble polar compound.

Other additives, of course, may be added to the oil composition of the present invention to form a finished lubricating oil. Such additives include oxidation inhibitors such as phenothiazine or phenyl-α-naphthylamine; rust inhibitors such as lecithin or petroleum sulphonate; wear inhibitors such as zinc dialkyl dithiophosphates, chlorinated kerosine-wax mixtures, and the like.

The invention will be more fully understood by reference to the following example.

EXAMPLE

*Procedure.*—Nine identical base oil blends were prepared from a mineral lubricating oil, a detergent additive, a V.I. improver and a wear inhibitor. To each base oil blend except one was added 1 wt. percent, based on the weight of the original blend, a different polar compound. Each resulting blend was then thoroughly agitated. The resulting blends were labeled B–I. The base oil blend having no polar compound was labeled blend A and used as a control. The Dean and Davis viscosity indexes of blend A and the resulting blends were then determined. The resulting blends and blend A were allowed to stand for several weeks. The V.I.'s of these blends were periodically determined throughout this time interval.

The base oil blends consisted of 32.5 wt. percent of mineral lubricating oil A, 56.2 wt. percent of mineral lubricating oil B, 0.9 wt. percent of wear inhibitor concentrate C, 4.5 wt. percent of detergent concentrate D, and 5.9 wt. percent of V.I. improver concentrate E. Mineral oil A had a viscosity at 210° F. of 10.07 centistokes. Mineral oil B had a viscosity of 4.41 centistokes at 210° F.

Wear inhibitor concentrate C was a commercial dialkyl dithiophosphate concentrate of 26 vol. percent diluent oil and 74 vol. percent of a zinc dialkyl dithiophosphate in which 65% of the alkyl groups were derived from a $C_5$ Oxo alcohol and 35% were derived from isobutanol.

Detergent concentrate D consisted of about 70 wt. percent active ingredient and about 30 wt. percent mineral lubricating oil. The active ingredient was prepared by heating a mixture consisting of about 40 wt. percent of a phosphosulfurized polyisobutylene, 30 wt. percent of an oil concentrate of a high barium content tertiary octylphenol sulfide, and about 30 wt. percent of an oil solution containing 60 wt. percent of a high barium content sulfonate.

The phosphosulfurized polyisobutylene was prepared by reacting polyisobutylene of about 1100 molecular weight with 15 wt. percent, based on the weight of polyisobutylene, of $P_2S_5$ at about 425° F. for about 8 hours under a nitrogen atmosphere. The oil concentrate of the barium tertiary octyl phenol sulfide consisted of about 43 wt. percent of said sulfide and about 57 wt. percent of a mineral lubricating oil. The barium tertiary octyl phenol sulfide was of the high alkalinity type having an alkaline neutralization number of about 90 and contained about 12 wt. percent barium. The high barium content sulfonate had a barium content of about 15 wt. percent based on the weight of the sulfonate. The alkyl-aryl portion of the sulfonate was prepared by alkylating benzene with polypropylene to produce a compound having an average molecular weight of about 440 of which 75 wt. percent had a molecular weight greater than 400. This compound was then sulfonated with sulfuric acid and neutralized with a barium base to produce a neutral barium sulfonate. The high barium sulfonate was prepared by reacting barium sulfonate with additional barium hydroxide followed by neutralizing by bubbling carbon dioxide through the sulfonate.

V.I. improver concentrate E, used above, consisted of about 33.9 wt. percent active ingredient and about 66.1 wt. percent mineral lubricating oil. The active ingredient consisted of a terpolymer prepared by copolymerizing about 71.3 mole percent vinyl acetate, about 3.5 mole percent maleic anhydride, about 17.8 mole percent di($C_8$ Oxo) fumarate, and about 7.4 mole percent di-tallow fumarate. The di-tallow fumarate was prepared by esterifying fumaric acid with alcohols derived from the hydrogenation of tallow. These tallow alcohols were obtained from the Archer-Daniels-Midland Co. under the trade name Aldol 63. They are a straight chain alcohol mixture comprising about 1 wt. percent $C_{12}$ alcohol, 6 wt. percent $C_{14}$ alcohol, 30 wt. percent $C_{16}$ alcohol, 60 wt. percent $C_{18}$ alcohol and 3 wt. percent $C_{20}$ alcohol. The average molecular weight of the alcohol mixture was about 265. The di-$C_8$ Oxo fumarate was obtained by esterifying fumaric acid with $C_8$ Oxo alcohols. The Oxo process for preparing alcohols is well known. In brief, the $C_8$ Oxo alcohols were prepared by reacting an olefin prepared by the reaction of butylene and propylene with carbon monoxide and oxygen to form a mixture of aldehydes which were hydrogenated to form the corresponding alcohols. The di-$C_8$ Oxo fumarate and di-tallow fumarates were mixed together to form a mixture having an average molecular weight of about 420. This mixture and the other constituent monomers of the polymer were polymerized at ambient temperature and pressure. Two wt. percent of benzoyl peroxide based on the total weight of the polymerizable materials was used as a catalyst. Two wt. percent of lauryl alcohol based on the total weight of the polymerizable materials was used as a moderator.

The V.I. test data for blends A–I are presented in Table I which follows.

*Table I*

| Blend | 1 wt. percent of Polar Compound [1] | Initial V.I. | V.I. Subsequent to Blending | | | | | | |
|---|---|---|---|---|---|---|---|---|---|
| | | | 4th day | 5th day | 6th day | 8th day | 10th day | 13th day | 15th day |
| A | None | 143.5 | 142.3 | 142.2 | | 141.9 | 141.6 | 140.7 | |
| B | (3,6,9-trioxa undecanol) (alcohol ether) | 145.0 | 144.9 | | | | 144.5 | | |
| C | Bis-(2-methoxyethyl) ether (poly-ether) | 145.5 | | 143.5 | | 143.7 | | | 144.0 |
| D | 1,2-Bis-(2-methoxyethoxy) ethane (poly-ether) | 145.0 | | 143.6 | | 143.3 | | | 143.6 |
| E | Diethyl maleate (ester) | 145.1 | | 143.6 | | 143.6 | | | 144.5 |
| F | α-Butyrolactam (lactam) | 143.7 | | | 143.3 | | | 142.7 | |
| G | Ethyl cyanoacetate (Nitrile-ester) | 149.6 | | | 149.1 | | | 147.5 | |
| H | Malononitrile (nitrile) | 145.4 | | | 147.5 | | | 147.5 | |
| I | α-Butyrolactone (lactone) | 145.1 | | | 144.4 | | | 144.0 | |

[1] The class to which each individual compound belongs is given in parentheses.

The data in Table I reveal that blends B through I, each of which contained a different polar compound, experienced a lesser rate of V.I. decrease than that of the base oil composition, blend A. Furthermore, as may be seen by comparing the initial V.I. of blend A with that exhibited by blends B–I, the blends which contained polar compounds exhibited higher initial V.I.'s than the blend which contained no such compound. This V.I. increase ranged from 0.2 to 6.1 units. Moreover, blend H actually demonstrated an increase in V.I. with time. In summary, it is seen that an increase in initial V.I. and a decrease in the rate of V.I. decline with time is accomplished in the present invention by adding certain oil-soluble polar compounds to lubricating oils which contain both a V.I. improver and a detergent additive.

What is claimed is:

1. A composition of matter comprising a major portion of mineral lubricating oil, 1 to 8 wt. percent of a polymeric viscosity index improver selected from the group consisting of oil soluble (*a*) homopolymers of ethylenically unsaturated esters of $C_2$ to $C_6$ mono- and dicarboxylic acids and $C_2$ to $C_{20}$ alcohols, (*b*) polyisobutylenes, (c) polyvinyl ethers, (d) copolymers of 2-N-vinyl pyrollidone and at least one monomer selected from the group consisting of ethylenically unsaturated esters of $C_2$ to $C_6$ mono- and dicarboxylic acids and $C_2$ to $C_{20}$ alcohols, (e) copolymers of maleic anhydride and at least one monomer selected from the group consisting of ethylenically unsaturated esters of $C_2$ to $C_6$ mono- and dicarboxylic acids and $C_2$ to $C_{20}$ alcohols, and (f) copolymers of at least two different monomers selected from the group consisting of ethylenically unsaturated esters of $C_2$ to $C_6$ mono- and dicarboxylic acids and $C_2$ to $C_{20}$ alcohols; 0.5 to 6.0 wt. percent of a metal salt lubricating oil detergent selected from the group consisting of neutral and basic alkali metal, alkaline earth metal and heavy metal salts of oil-soluble petroleum sulfonates, synthetic alkyl aryl sulfonates, alkyl phenates, alkyl phenate sulfides and reaction products of said basic metal salts with phosphosulfurized olefin polymers; and 0.1 to 5.0 wt. percent of a compound selected from the group consisting of:

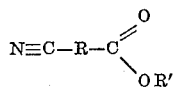

wherein R comprises a divalent aliphatic hydrocarbon group containing 0 to 4 carbon atoms and R′ comprises an alkyl radical containing 1 to 3 carbon atoms; and

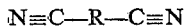

wherein R comprises a divalent aliphatic hydrocarbon group containing 1 to 3 carbon atoms.

2. A composition of matter according to claim 1 wherein said compound is

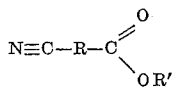

wherein R comprises a divalent aliphatic hydrocarbon group containing 0 to 4 carbon atoms and R′ comprises an alkyl radical containing 1 to 3 carbon atoms.

3. A composition of matter according to claim 1 wherein said compound is

wherein R comprises a divalent aliphatic hydrocarbon group containing 1 to 3 carbon atoms.

4. A composition of matter according to claim 2 wherein said compound is ethyl cyanoacetate.

5. A composition of matter according to claim 3 wherein said compound is malononitrile.

References Cited in the file of this patent

UNITED STATES PATENTS

| | | |
|---|---|---|
| 2,411,593 | Routson | Nov. 26, 1946 |
| 2,602,048 | Michaels | July 1, 1952 |
| 2,836,613 | Heininger | May 27, 1958 |
| 2,977,304 | Ferm et al. | Mar. 28, 1961 |
| 2,977,305 | Abbott | Mar. 28, 1961 |
| 3,003,959 | Wilson et al. | Oct. 10, 1961 |
| 3,045,037 | Benedetti | July 17, 1962 |

OTHER REFERENCES

Zuidema: "The Performance of Lubricating Oils," Reinbold Publishing Corporation, New York, 1959, page 36.